Patented Aug. 1, 1933

1,920,333

UNITED STATES PATENT OFFICE 1,920,333

METHOD FOR THE PRODUCTION OF NITROSYLCHLORIDE

Colin W. Whittaker and Frank O. Lundstrom, Washington, D. C., dedicated to the free use of the public No Drawing. Application February 27, 1932
Serial No. 595,672

9 Claims. (Cl. 23—203)

(Granted under the Act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without payment to us of any royalty thereon.

We hereby dedicate the invention herein described to the free use of the public to take effect upon the granting of a patent to us.

This invention relates to the manufacture of nitrosylchloride from solid, humid chlorides or from solid, humid minerals, salts or mixtures containing chlorides by treating such chlorides with oxides of nitrogen.

We have discovered that nitrosylchloride is formed when oxides of nitrogen are brought in contact with solid chlorides or solid minerals, salts or mixtures containing chlorides in a humid condition. Examples of such minerals are kainit and muriate which are available in large quantities.

We are aware that Walenty Dominik in U. S. Patent 1,658,519 describes the production of a mixture of chlorine and nitrosylchloride by treating metallic chloride with aqueous nitric acid, but our process produces nitrosylchloride without the use of aqueous nitric acid or other solution.

In order to specifically illustrate our present invention but without limiting the same we give the following example:

Pass nitrogen peroxide so as to come into contact with solid, humid potassium chloride or muriate packed in a tower or converter. The nitrogen peroxide may be derived from ammonia oxidation or other source. Nitrosylchloride will be formed and may be collected by any suitable means. The process can be conveniently carried out at ordinary temperatures, but we do not limit ourselves to such temperatures.

We have discovered that the process may be conducted more favorably if the solid chlorides or minerals, salts or mixtures containing chlorides are humidified with water when or before being exposed to the oxides of nitrogen. When oxides of nitrogen were passed over solid potassium chloride humidified with water to the extent of two and five tenths per cent by weight, approximately eighty four per cent of the effluent gas was found to be nitrosylchloride, whereas when the dry salt was used little or no nitrosylchloride was formed. This humidification may be accomplished in any suitable manner such as addition of liquid water, or exposure to a damp atmosphere when or before the nitrogen peroxide is passed in contact with the potassium-chloride.

It is specifically understood that by the term nitrogen peroxide, as used herein, is meant nitrogen dioxide ($NO_2$), nitrogen tetroxide ($N_2O_4$), and mixtures of the two; also mixtures containing other oxides of nitrogen such as nitric oxide (NO or $N_2O_2$) and oxygen (in its various forms O, $O_2$, $O_3$, etc.).

It is further specifically understood that by the term substance as used therein is meant minerals, salts and compounds.

It is further specifically understood that by the term "humid condition" is meant any concentration of water up to sufficient water to cause the appearance of a definite, visible, liquid phase.

Having fully described our discovery, we claim as our invention:

1. The method of producing nitrosylchloride which comprises treating solid substances in a humid condition, such substances containing alkali chlorides, with oxides of nitrogen.

2. The method of producing nitrosylchloride which comprises treating solid, humid substances containing alkali chlorides with nitrogen peroxide.

3. The method of producing nitrosylchloride which comprises treating solid, humid alkali metal chlorides with gaseous oxides of nitrogen.

4. The method of producing nitrosylchloride which comprises treating solid alkali metal chlorides, in a humid condition, with gaseous nitrogen peroxide.

5. The method as specified in claim 1, when water is added or used with the solid substance containing chlorides up to but not including sufficient water to cause any appreciable change in the solid state of the substance containing chlorides.

6. The method as specified in claim 1, when solid potassium chloride is used which contains from one thousandth of one per cent to twenty five per cent water by weight.

7. The method as specified in claim 1, when solid potassium chloride is used which contains two and five tenths (2.5) per cent water by weight.

8. The method of producing nitrosylchloride which comprises treating solid humid alkali metal chlorides with oxides of nitrogen.

9. The method of producing nitrosylchloride which comprises treating solid alkali metal chlorides, in a humid condition, with nitrogen peroxide.

COLIN W. WHITTAKER.
FRANK O. LUNDSTROM.